United States Patent [19]

Larson

[11] Patent Number: 4,745,881
[45] Date of Patent: May 24, 1988

[54] MILKING INFLATION

[76] Inventor: Reed A. Larson, N. 7766 Hwy. 26, Watertown, Wis. 53094

[21] Appl. No.: 904,454

[22] Filed: Sep. 8, 1986

[51] Int. Cl.⁴ .............................................. A01J 5/01
[52] U.S. Cl. .................................................. 119/14.51
[58] Field of Search ............... 119/14.36, 14.47, 14.48, 119/14.49, 14.50, 14.51, 14.52, 14.53; 138/120

[56] References Cited

U.S. PATENT DOCUMENTS

| | | | |
|---|---|---|---|
| 2,099,884 | 11/1937 | Green | 31/84 |
| 2,219,945 | 10/1940 | Scott | 119/14.51 |
| 2,341,953 | 2/1944 | Scott | 31/84 |
| 2,578,184 | 12/1951 | Green | 138/120 X |
| 2,694,379 | 11/1954 | Hein | 119/14.47 |
| 2,744,496 | 5/1956 | Röben | 119/14.53 X |
| 3,079,891 | 3/1963 | Miller | 119/14.49 |
| 3,430,662 | 3/1969 | Guarnaschelli | 138/120 |
| 3,611,993 | 10/1971 | Norton | 119/14.36 |
| 3,699,684 | 10/1972 | Sixt | 138/120 X |
| 3,858,615 | 1/1975 | Weigl | 138/121 |
| 3,908,703 | 9/1975 | Bournazel | 138/120 |
| 4,172,473 | 10/1979 | Lefere et al. | 138/120 |
| 4,196,696 | 4/1980 | Olander | 119/14.51 |
| 4,324,201 | 4/1982 | Larson | 119/14.51 |
| 4,372,250 | 2/1983 | Larson | 119/14.47 |
| 4,441,454 | 4/1984 | Happel et al. | 119/14.36 |

FOREIGN PATENT DOCUMENTS 212452  1/1958  Australia ........................ 119/19.47

Primary Examiner—David A. Scherbel
Assistant Examiner—Creighton Smith
Attorney, Agent, or Firm—Glenn A. Busé

[57] ABSTRACT

The milking tube section for a milking inflation is provided with a plurality of axially spaced, circumferentially extending grooves which define segments having opposed edges and which are dimensioned to permit relative movement of the sides of adjacent segments and afford a predetermined degree of bending movement of one segment relative to the adjacent segment in one direction without causing a substantial reduction in the internal cross sectional area of the flow passage through the stem portion of the milking tube section. The grooves are also dimensioned so that, after such predetermined bending in one direction, the edges of adjacent segments on one side of the stem portion abut and hinder further bending of the stem portion in that direction.

8 Claims, 1 Drawing Sheet

MILKING INFLATION

BACKGROUND OF THE INVENTION

This invention relates to liners or inflations for teat cup assemblies of vacuum-operated milking machines and, more particularly, to such liners or inflations including a milking tube section which extends from a teat cup shell and is attached to the nipple of the milking machine claw.

Automatic milking machines employ teat cup assemblies including a hollow, rigid outer shell which is attached to a pulsating vacuum line and a resilient, tubular liner or inflation installed in the shell in a manner to form a seal at both ends of the shell. The cow's teat is inserted into the upper end of the inflation and the lower end is connected to a so-called claw of the milking machine. During the milking operation, the teat cup assembly is suspended from a cow's teat, primarily by the engagement between an opening or mouth in the upper or head end of the inflation and the cow's teat and milk flows through the inflation under the influence of a vacuum maintained in the milking machine claw.

One type inflation is a one-piece unit including an upper or shell section adapted to fit inside the shell and a lower or milking tube section which is pulled through and extends from an opening in the lower end of the shell and is adapted to be connected to the nipple of the milking claw.

Another type inflation includes an upper or shell section having a lower end which fits through an opening in the lower end of the shell and a separate milking tube section which is connected to the lower end of the shell section via a rigid, sleeve connector which is press-fitted inside the lower end of the shell section.

A further type inflation includes an upper shell section having a lower end which is adapted to be folded back over the open lower end of the shell and a separate milking tube section having a cup-shaped upper end adapted to fit over the folded back portion of the shell section.

The following United States patents are representative of prior art constructions for milking tube sections of milking inflations:

| Patentee | U.S. Pat. No. | Issue Date |
| --- | --- | --- |
| Green | 2,099,884 | November 23, 1937 |
| Scott | 2,341,953 | February 15, 1944 |
| Hein | 2,694,379 | November 16, 1954 |
| Norton | 3,611,993 | October 12, 1971 |
| Olander | 4,196,696 | April 8, 1980 |
| Larson | 4,324,201 | April 13, 1982 |
| Larson | 4,372,250 | February 8, 1983 |

Originally, the inside diameter of the flow passage through the milking tube section of milking inflations could be relatively small because milk flow was quite small. The milking tube section was quite flexible because the small inside diameter permitted the walls to be made relatively thin and still not collapse when subjected to a vacuum during the milking operation. This flexibility permitted the teat cup to be conveniently lifted up and slipped onto a cow's teat without imparting a significant side force on the teat.

Modern dairy cows produce milk at substantially higher flows and, consequently, it has become necessary to increase the inside diameter of the flow passage through the milking tube section in order to accommodate this increase in milk flow. As the inside diameter of the milking tube increases, the wall thickness also must be increased to prevent the walls from collapsing during the milking operation. The increased wall thickness makes the milking tube section relatively stiff.

This stiffness resists movement of the shell into proper orientation for attachment to a cow's teat and can cause the mouthpiece of the inflation to engage a cow's teat at an angle and/or to exert a side force on the teat. This can cause discomfort for the cow. More importantly, such a side force can cause the opening to become slightly distorted, resulting in a non-uniform seal around the teat and undesirable admission of air through the mouthpiece opening which can cause slurping and produce unhealthy conditions for the teat.

Copending application Ser. No. 793,156, filed Oct. 31, 1985 and assigned to the asignee of this application, discloses that these and other problems associated with stiff milking tube sections can be minimized by providing a circumferentially extending groove in the milking tube section near the lower end of the shell. The groove, by permitting relative bending between the stem portion of the milking tube section and the shell, acts much like a swivel joint and facilitates installation of the teat cup assembly on a cow's teat without a substantial reduction in the cross sectional area of the flow passage.

This invention provides a milking tube section having an increased capability for flexing without kinking which can cause a reduction in the internal cross sectional area of the flow passage through the stem portion.

SUMMARY OF THE INVENTION

An object of the invention is to provide a milking tube section for a milking inflation which is arranged to accommodate the higher milk flow of modern dairy cows and yet have sufficient flexibility to permit the stem portion to be more easily bent or flexed for proper orientation of the shell for attachment of the mouthpiece to a cow's teat.

Another object of the invention is to provide such a milking tube section which has a substantially crevice-free flow passage and can be bent or flexed a predetermined degree in one direction without a substantial reduction in the internal cross sectional area of the flow passage.

A further object of the invention is to provide such a milking tube section which is arranged to hinder further bending of the stem portion in one direction after a predetermined degree of bending in that direction and thereby reduce kinking.

Other objects, aspects and advantages of the invention will become apparent to those skilled in the art upon reviewing the following detailed description, the drawing and the appended claims.

The milking inflation of the invention is made from an elastomeric material, such as a rubber composition, is adapted for installation on a teat cup shell and has an elongated milking tube section extending from the lower end of the shell. The milking tube section includes an elongated stem portion having a substantially crevice-free inner wall defining a flow passage extending therethrough. A plurality of axially, circumferentially extending grooves are provided in the exterior surface and along the length of the stem portion between the upper and lower ends thereof. The grooves define adjacent segments having opposed edges and are dimensioned to permit relative movement of the edges of adjacent segments and afford a predetermined degree of bending movement of one segment relative to the adjacent segment in one direction without causing a substantial reduction in the internal cross sectional area of the flow passage. The grooves also are dimensioned so that, after such predetermined bending in one direction, the edges of adjacent segments on one side of the stem portion abut and hinder further bending of the stem portion in that direction.

The grooves preferably are equally spaced along the stem portion to define segments having a substantially uniform axial dimension and preferably are dimensioned to permit one segment to be moved relative to the adjacent segment through an arc of about 8° to about 10°. The wall thickness of the stem portion at the bottom most part of the grooves preferably is about 60 to about 75% of the wall thickness of the segments.

For standard length milking tube sections, at least 7 grooves are preferred.

DESCRIPTION OF THE PREFERRED EMBODIMENT

Figure 1:
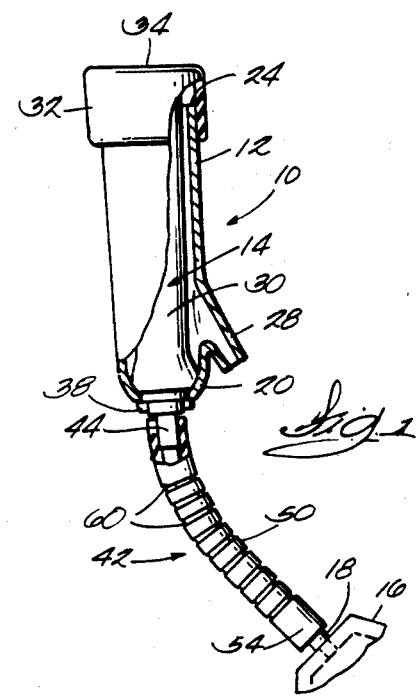
FIG. 1 is a partially sectioned, side elevational view of a teat cup assembly carrying a milking inflation shell section and a milking tube section of the invention, shown with the mouthpiece of the shell section attached to a cow's teat and the milking tube section connected to a nipple on a milker claw.

Illustrated in FIG. 1 is a teat cup assembly 10 including a rigid, generally cylindrical outer shell 12 which supports and surrounds a portion of a milking inflation 14 connected to the milker claw 16 (shown fragmentarily). The milker claw 16 is connected to a suitable vacuum system (not shown) in the usual manner and includes a plurality of upwardly projecting nipples 18 (one shown).

The shell is formed from a metal, such as stainless steel, or another suitable rigid material, such as a synthetic thermoplastic or a thermosetting resin. The shell 12 has a bottom 20 including an opening 22 of reduced diameter and an upper end terminating in a rim 24.

Located in the side of the shell 12 is a nipple 28 connected, via suitable tubing (not shown), in communication with a pulsator which alternately opens to atmospheric pressure and evacuates the chamber between the interior wall of the shell 12 and the inflation 14 to alternately contract and expand the inflation for milking.

In the construction illustrated in FIG. 1-4, the inflation is a three-piece unit and includes an elongated, generally cylindrical suction sleeve or barrel section 30 which fits inside the shell 12 and a head section 32 which fits over the shell rim 28 and has a mouthpiece 34 including a circular opening (not shown) for receiving a cow's teat. The shell section 30 also includes a lower end 38 which fits into the opening 22 in the lower end of the shell 12.

The inflation 14 also includes a separate milking tube section 42 and a sleeve connector 44 having an enlarged upper end portion 46 which fits inside the lower end of 38 of the barrel section 30 and presses the outer wall of the lower end 38 into sealing engagement with the shell opening 22. The sleeve connector 44 has a reduced lower end portion 48.

The barrel section 30 and the milking section 42 are tubular members molded from a flexible or elastomeric material, preferably a synthetic or natural rubber composition including curing agents and the like.

Figure 2:
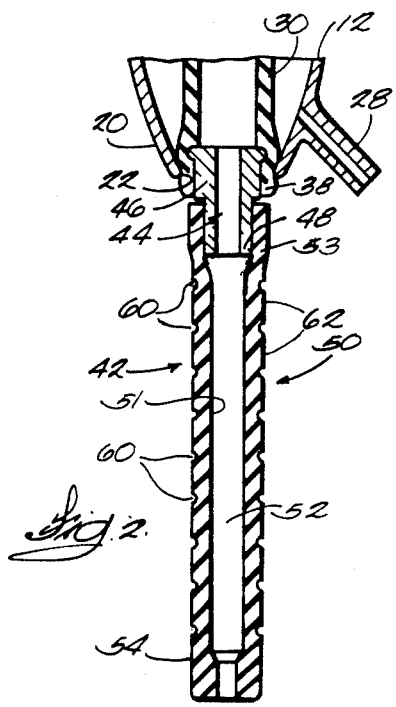
FIG. 2 is an enlarged, partially fragmentary and sectioned, side elevational view of the teat cup and assembly and milking inflation illustrated in FIG. 1.

As best shown in FIG. 2, the milking tube section 42 includes an elongated stem portion 50 having a substantially crevice-free inner wall 51 defining a flow passage 52 extending therethrough and an upper end portion of 53 which fits over the reduced end portion of 48 of the sleeve connector 44. The inner wall 51 should be smooth or at least substantially crevice free to facilitate cleaning between milking operations. If the inner wall 51 has corrugations or similar crevices, it is difficult to remove all the residual milk and know that it has been removed, particularly after the inflation has been allowed to sit long enough for the milk to dry.

The milking tube section 50 also includes a lower or claw end portion of 54 which extends from the stem portion 50 and is adapted to be slipped onto a claw nipple 18.

When the teat cup 10 is in the position illustrated in FIG. 1 with the mouthpiece 34 of the barrel section 30 slipped onto the cow's teat, milk flows through the barrel section 30, the sleeve connector 44, the flow passage 52 of the stem portion 50, the claw nipple 18 and then into the claw 16.

The inside diameter of the flow passage 52 typically is in the order of about 7/16 to ½ inch and the wall thickness of the stem portion 50 typically is in the order of about 3/16 inch. Thus, the stem portions of conventional large tube inflations usually are relatively stiff and ordinarily resists bending when the teat cup assembly is lifted upwardly for attachment to a cow's teat. Consequently, the mouthpiece 34 can engage the cow's teat at an angle and/or exert a side force on the teat with the attendant problems discussed above.

Figure 3:
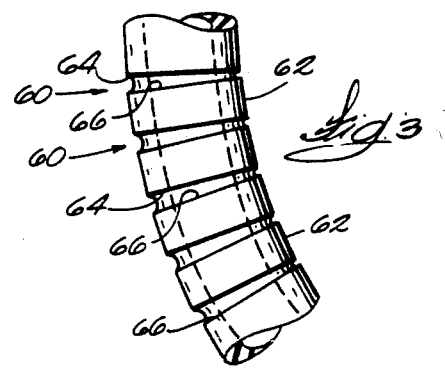
FIG. 3 is an enlarged, fragmentary view of the stem portion of the milking tube section illustrated in FIG. 1, shown in a partially bent or flexed position.

The stem portion 50 is arranged to minimize this undesirable condition and yet remain stiff enough to resist collapsing during the milking operation. More specifically, a plurality of axially spaced, circumferentially extending grooves 60 are provided in the exterior surface of the stem portion 50 and along the length thereof between the upper and lower ends 53 and 54. These grooves 60 define a plurality of segments 62 having opposed edges 64 and 66. The grooves 60 are dimensioned to permit relative movement between the edges 64 and 66 of adjacent segments 62 as illustrated in FIGS. 3 and 4 and afford a predetermined degree of bending movement of one segment relative to the adjacent segment in one direction without substantial kinking which can cause a reduction in the internal cross sectional area of the flow passage 52 of the stem portion 50.

Figure 4:
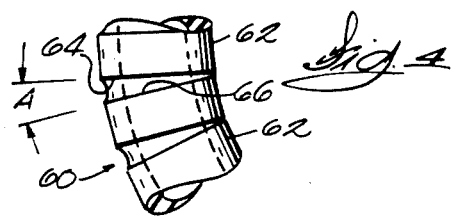
FIG. 4 is a view similar to FIG. 3 with the adjacent segments of the stem portion shown in a fully bent or flexed position.

The grooves 60 also are dimensioned so that, after a predetermined degree of bending movement in one direction, opposed edges 64 and 66 of adjacent segments 62 on one side of the stem portion 50 abut as illustrated in FIG. 4. Once this occurs, further bending of the stem portion 50 which might cause kinking and a reduction in the internal cross sectional area of the flow passage 52 is hindered.

The grooves 60 serve to make the stem portion 50 more flexible for bending and the edges 64 and 66 of the segments 62 act as stops for limiting bending in one direction to a degree which does not cause kinking and a resulting reduction in the internal cross sectional area of the flow passage 52. The thicker walled segments 62 support each other and provide enough overall stiffness to prevent the stem portion 50 from collapsing during the milking operation. Thus, the material of the stem portion is supported on itself when the stem portion is bent and adjacent segments are abutting.

As a guide, the grooves 60 can be dimensioned so that one segment 62 can be moved relative to the adjacent segment 62 through an arc A (FIG. 4) of about 8° to about 10° before the edges 64 and 66 of the adjacent segments abut. The grooves 60 preferable are equally placed along the stem portion 50 to define segments 62 having substantially uniform axial dimensions and thereby provide uniform incremental bending. As a further guide, the wall thickness of the stem portion 50 at the bottommost portion of each groove 60 can be about 60 to about 75% of the wall thickness of the segments 62.

As the number of grooves 60 and 62 are increased, the overall flexibility of the milking tube section 42 increases. For instance, a standard 5¼ inch milking tube section having an outside diameter of about ¾ inch and a wall thickness of about 3/16 inch can be made flexible enough to be bent approximately 90° without kinking by using nine grooves which are approximately 0.06 inch wide and 0.055 inch deep and are equally spaced apart approximately 0.35 inch along the central portion of the stem portion 50. Although each groove permits a maximum of bending movement of approximately 8° to 10° between adjacent segments, such a relatively large number of grooves permit a total bending movement of approximately 90°.

On the other hand, the number of grooves should not be increased to a point where the stem portion 50 becomes so flexible that the walls collapse during the milking operation. Accordingly, the upper limit for the number of grooves 60 depends on the type of material used for the milking tube section, the length and wall thickness of the milking tube section, width and depth of the grooves, etc. As a guide, at least 7 grooves should be provided in a standard milking tube section.

Figure 5:
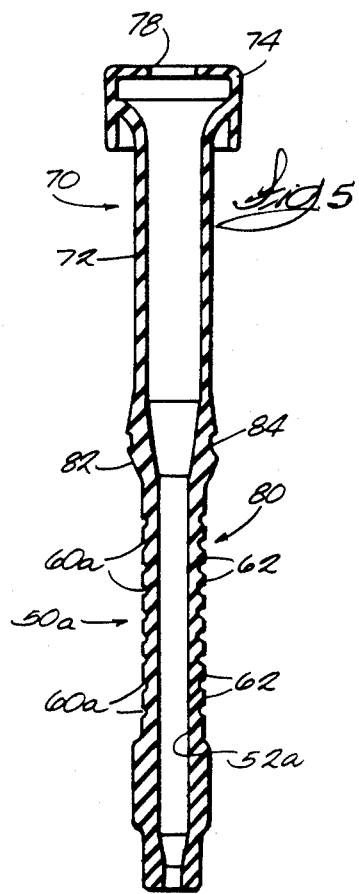
FIG. 5 is a sectioned, side elevational view of a one-piece type milking inflation incorporating the invention.

FIG. 5 illustrates a one-piece type milking inflation 70 including an elongated, generally cylindrical shell section 72 which fits inside the shell, a head section 74 which fits over the shell rim and includes a mouthpiece 70 having a circular opening 78 for receiving a cow's teat, and a generally cylindrical, reduced diameter milking tube section 80 which extends from the shell.

The milking tube section 80 includes an externally enlarged retaining portion 82 which is squeezed through an opening in the lower end of the shell by pulling on the milking tube section 80 after the head section 74 is fitted into place over the shell rim. The retainer portion 82 has a flange 84 which surrounds the shell opening and is retained in sealing engagement with a shell after the milking tube section 80 is released.

The milking tube section 80 includes an elongated stem portion 50a, similar to stem portion 50 above and having a flow passage 52a similar to flow passage 52, and an upper end 84 connected to the retaining portion 82. The milking tube section 80 also includes a lower or claw end portion 84 which extends from the lower end 84 of the stem portion 50a and is adapted to be slipped onto a claw nipple.

A plurality of axially spaced, circumferentially extending grooves 60a, similar to grooves 60 above, are provided in the exterior surface and along the length of the stem portion of 50a between the upper and lower ends 84 and 86 thereof. The grooves 60a define a plurality of segments 62a similar to segments 60 above.

Figure 6:
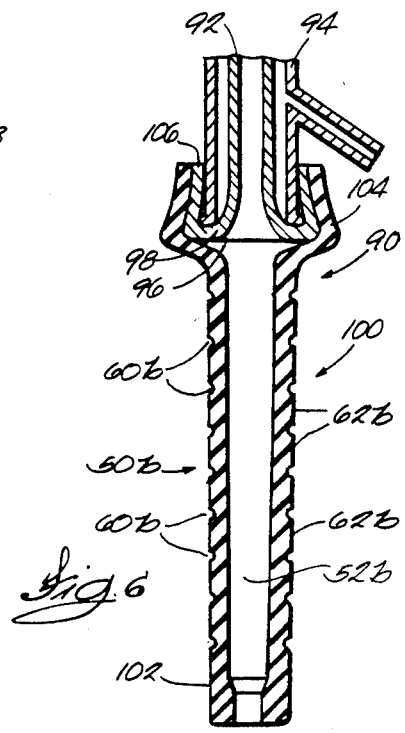
FIG. 6 is a section, side elevational view of a two-piece type milking inflation incorporating the invention.

FIG. 6 illustrates a two-piece type milking inflation 90 including a separate shell section 92 (illustrated fragmentarily) which fits inside a shell 94 and has a lower end portion 96 which extends into the open lower end 98 of the shell 94 and is folded back over the outer surface of the lower end of the shell 94. The inflation 90 also includes a separate milking tube section 100 having a stem portion 50b, similar to stem portion 50 above and having a flow passage 52b similar to flow passage 52 above, and a claw end portion 102 adapted to be slipped over a claw nipple. The milking tube section 100 has an enlarged, cup-shaped upper end portion 104 which fits over and sealingly engages the lower portion 96 of the shell section 92.

A plurality of axially spaced, circumferentially extending grooves 60b, similar to grooves 60 above, are provided in the exterior surface and along the length of the stem portion 50b between the upper end portion 104 and the claw end portion 102. The grooves 60b define a plurality of segments 62b similar to segments 62 above.

From the foregoing description, one skilled in the art can easily ascertain the essential characteristics of the invention and, without departing from the spirit and scope thereof, make various changes and modifications to adapt it to various usages.

I claim:

1. A milking inflation for use with a teat cup assembly including a rigid shell having a lower end, said inflation being made from an elastomeric material and having an elongated tubular milking tube section extending from the lower end of the shell, said milking tube section comprising:

an elongated stem portion including upper and lower end portions, an exterior surface, and a substantially crevice-free inner wall defining a flow passage extending therethrough; and a plurality of axially spaced, circumferentially extending grooves in the exterior surface and extending along the length of said stem portion between said upper and lower end portions, said grooves defining segments having opposed edges and being dimensioned to permit relative movement of said edges of adjacent segments and afford a predetermined degree of bending movement of one segment relative to the adjacent segment in one direction without causing substantial kinking of said step portion which reduces the internal cross sectional area of said flow passage and, after said predetermined bending, to cause said edges of adjacent segments on one side of said stem portion to abut and hinder further bending of said stem portion in said one direction said grooves and segments being further dimensioned to prevent said stem portion from collapsing when subjected internally to a reduced pressure condition during operation of a milking machine.

2. A milking machine inflation according to claim 1 wherein said grooves are dimensioned to permit one segment to be moved relative to the adjacent segment through an arc of about 8° to about 10° before said edges abut.

3. A milking machine inflation according to claim 1 wherein said grooves are equally spaced apart and define segments of having a substantially uniform axial dimension.

4. A milking machine inflation according to claim 1 wherein said grooves include a bottommost portion and the wall thickness of said stem portion at said bottommost portion is about 60 to about 75% of the wall thickness of said segments.

5. A milking machine inflation according to claim 2 including at least 7 of said grooves.

6. A milking machine inflation according to claim 1 wherein:
   said inflation is a multi-piece unit including a separate shell section adapted to fit into inside the shell and having a lower end portion which is adapted to extend through an opening in the bottom of the shell and further including a sleeve connector having an upper end adapted to fit inside said shell lower end portion and press the outer surface thereof into sealing engagement with shell opening and lower end adapted to receive the upper end of said stem portion of said milking tube section; and
   said milking tube section is a separate part.

7. A milking machine inflation according to claim 1 wherein said inflation is a one-piece unit including a shell section extending from said milking section and adapted to fit inside the shell.

8. A milking machine inflation according to claim 1 wherein said inflation is a multi-piece unit including a separate shell section adapted to fit inside the shell and having a lower end portion which is adapted to extend through an opening in the lower end of the shell and to be folded back over the outer surface of the shell; and
   said milking tube is a separate part and includes a cup-shaped upper end portion extending from the lower end of said portion and adapted to fit over said folded back portion.

* * * * *